United States Patent [19]

Van Wingerden et al.

[11] Patent Number: 5,365,693
[45] Date of Patent: Nov. 22, 1994

[54] METHOD AND APPARATUS FOR TRANSPLANTING PLANTS FROM ONE CONTAINER TO ANOTHER

[75] Inventors: Teunis Van Wingerden, Huntersville, N.C.; Frank W. Van Dijk, Bergschenhoek, Netherlands

[73] Assignee: Metrolina Greenhouses, Inc., Huntersville, N.C.

[21] Appl. No.: 943,326

[22] Filed: Sep. 10, 1992

[51] Int. Cl.$^5$ .................................. A01C 11/02
[52] U.S. Cl. ........................... 47/1.01; 47/901; 111/105
[58] Field of Search ............ 111/100, 103, 104, 105, 111/116; 47/1 A, 901, 1.01

[56] References Cited

U.S. PATENT DOCUMENTS

| | | | |
|---|---|---|---|
| 4,278,035 | 7/1981 | Pickett et al. | 111/116 |
| 4,672,901 | 6/1987 | Stine | 111/116 |
| 4,947,579 | 8/1990 | Harrison et al. | 47/901 |
| 4,998,945 | 3/1991 | Holt et al. | 47/901 |
| 5,054,831 | 10/1991 | Ting et al. | 294/61 |
| 5,215,550 | 6/1993 | Tesch, Jr. et al. | 47/901 |

FOREIGN PATENT DOCUMENTS

| | | | |
|---|---|---|---|
| 40337 | 11/1981 | European Pat. Off. | 111/105 |
| 0373872A1 | 12/1989 | European Pat. Off. | |
| 2557762 | 7/1985 | France | 47/1 A |
| 2578142 | 11/1985 | France | |
| WO86/01975 | 10/1986 | France | |
| 2610786 | 8/1988 | France | 47/1 A |
| 3628003 | 2/1988 | Germany | 47/1 A |
| 9101089 | 6/1991 | Netherlands | |
| 2186776A | 2/1986 | United Kingdom | |
| 9203907 | 3/1992 | WIPO | 47/901 |

*Primary Examiner*—Clifford D. Crowder
*Assistant Examiner*—Amy B. Vanatta
*Attorney, Agent, or Firm*—Shefte, Pinckney & Sawyer

[57] ABSTRACT

Plant seedlings are transplanted from a germination tray to one or more maturation trays by penetrating the soil plug surrounding the plant and its root system in the seedling tray by means of a rotating spirally coiled shaft, withdrawing the seedling, soil plug and shaft as a unit from the germination tray, inserting the plant, soil plug and shaft unit into the maturation container, and penetrating the soil plug with a needle-like holding implement while rotating the coiled shaft in a reverse direction to withdraw the shaft from the plug and deposit the plug and plant within the maturation container. In the preferred embodiment, a plurality of such coiled shafts are provided on a traveling frame controlled by a microprocessor to enable mass transplantation of plural seedlings to be carried out on a rapid automated basis.

8 Claims, 2 Drawing Sheets

METHOD AND APPARATUS FOR TRANSPLANTING PLANTS FROM ONE CONTAINER TO ANOTHER

BACKGROUND OF THE INVENTION

The present invention relates broadly to horticultural methods and apparatus and, more particularly, to a method and apparatus by which plants may be transplanted from one growing container to another.

In the horticultural industry, the cultivation and maturation of plants to a state ready and suitable for sale is highly labor intensive. By way of example, many, if not most, vegetable and ornamental flower plants are cultivated from seed by initially germinating seeds in soil in a germination tray and then manually separating and transplanting the individual seedlings into a more sparse arrangement in another tray for continued growth. Not only is this manual operation time consuming and laborious, the manual handling of the seedlings tends to increase the risk of seedling damage or death.

SUMMARY OF THE INVENTION

It is accordingly an object of the present invention to provide a novel method and apparatus by which plants can be transplanted from a first growing container to a second growing container on an automated basis to largely eliminate the conventional labor requirement for such operations and, in turn, substantially improve the economy and profitability thereof.

Briefly summarized, the method and apparatus of the present invention basically involves the use of a reversibly rotatable spirally coiled shaft which can penetrate and withdraw from the soil plug in which a plant is rooted coaxially about the lengthwise extent of the plant and its root system so as to avoid damage thereto. The present invention also contemplates the provision of a movable holding implement which can selectively penetrate the soil plug in conjunction with the coiled shaft to facilitate rotational withdrawal thereof from the soil plug.

More particularly, the method of the present invention basically involves the steps of initially penetrating the soil plug in a first container with the spirally coiled shaft coaxially about the plug axis (i.e., the lengthwise extent of the plant and its root system) while rotating the shaft in a first rotational direction. The plant and soil plug are then withdrawn with the shaft as a unit from the first container by moving the shaft away from the first container generally along the plug axis. The withdrawn plant and soil plug are inserted along with the shaft as a unit into the second container. The soil plug is penetrated by the holding implement while rotating the shaft opposite to its first rotational direction in order to withdraw the shaft from the soil plug and deposit the soil plug and the plant within the second container.

To accomplish this method, the apparatus of the present invention provides a suitable arrangement for selectively moving the coiled shaft toward and away from the soil plug generally coaxially about the plug axis along with an appropriate arrangement for rotating the shaft selectively in opposite rotational directions. The holding implement is movably mounted in association with the shaft to selectively penetrate a soil plug held by the shaft when the shaft is rotated in its reverse direction for withdrawal from the soil plug.

In the preferred embodiment of the present method and apparatus, a plurality of the coiled shafts and a corresponding plurality of the holding implements are arranged for simultaneous operation, e.g., mounted to a common support frame with the shafts being rotated by a common drive and the holding implements movable by a common actuating arrangement. In this manner, the present method and apparatus can be carried out for transplanting a plurality of plant and soil plug units from a first germination container to a second growing container having a corresponding plurality of plug depositing receptacles. Such receptacles in the second container are initially filled with soil and a dibbler or other suitable implement is operable to form a depression in the soil in each receptacle for receipt of the plant and soil plug units from the first container.

It is additionally preferred that each holding implement be arranged at an angular orientation relative to the axial extent of its associated coiled shaft so as to avoid interference with rotation of the shaft when the holding implement is operated to penetrate a soil plug held by the shaft. Each holding implement may also be constructed to deliver a supply of water to the plant in a soil plug penetrated by the implement.

DESCRIPTION OF THE PREFERRED EMBODIMENT

Figure 1:
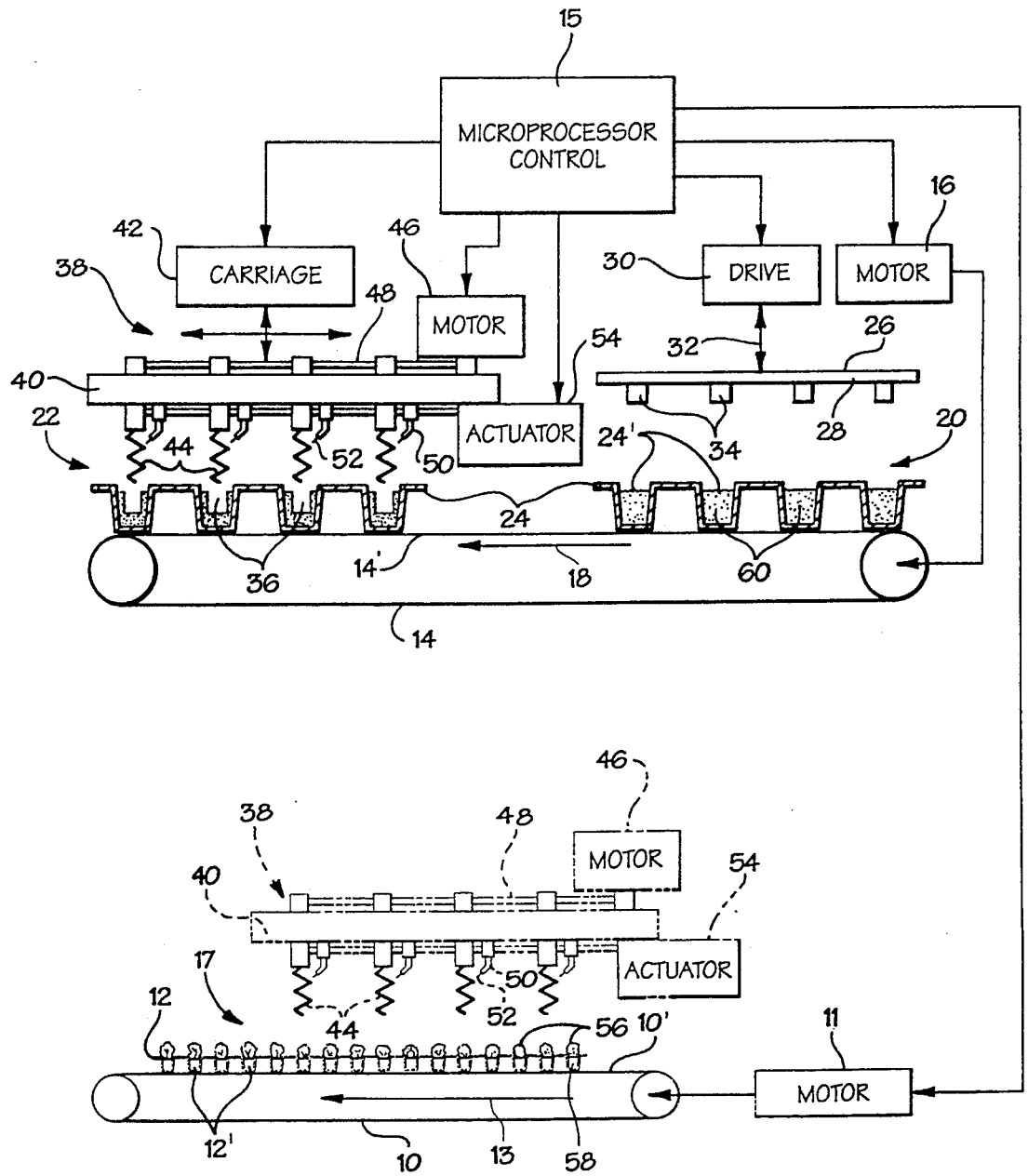
FIG. 1 is a schematic illustration of the preferred embodiment of the present method and apparatus.

Referring now to the accompanying drawings and initially to FIG. 1, a preferred embodiment of the transplanting method and apparatus of the present invention is schematically illustrated. Basically, the preferred apparatus of the present invention includes a first tray support conveyor 10 forming a transplant pick-up station 17 on which may be supported a seedling germination tray 12 from which plural individual plant seedlings are to be transplanted. The tray support conveyor 10 is driven intermittently and incrementally by a motor 11 under the control of a central microprocessor 15 to travel along its upper run 10' in the direction of the arrow 13. Parallel to the tray support conveyor 10 is another tray support conveyor 14 which is intermittently driven by a drive motor 16 under the control of the microprocessor 15 to cause the upper run 14' of the conveyor 14 to travel in the direction indicated by the arrow 18 to convey plant maturation trays 24 successively beneath a tray preparation station 20 and a transplant depositing station 22. As schematically depicted in FIG. 1, the transplant depositing station 22 along the tray support conveyor 14 is directly transversely adjacent the transplant pick-up station 17 of the tray support conveyor 10.

The seedling germination tray 12 and the plant maturation trays 24 are of substantially conventional constructions, each of a rectangular construction formed with plural soil containment receptacles or cells 12',24', respectively, arranged in perpendicularly oriented lengthwise and transverse rows. As will be understood by those persons skilled in the relevant art, the receptacles 12' in the seedling germination tray 12 are substantially smaller in dimension and volume and substantially greater in number than the receptacles 24' of the plant maturation tray 24, in order to enable the germination tray 12 to maximize the density of seed germination. For purposes of the present invention, as will be more fully explained hereinafter, the number of receptacles 12' in the seedling germination tray 12 should be a multiple of the number of receptacles 24' in the plant maturation tray 24. For example, the germination tray 12 may have 288 receptacles 12' while the maturation tray 24 may have 48 receptacles 24'.

The tray preparation station 20 is equipped with a dibbler mechanism 26 preferably comprised of a frame 28 which is supported by a drive mechanism, shown only representatively at 30, controlled by the microprocessor 15 for vertical reciprocation toward and away from the conveyor 14, as indicated by the directional arrow 32. The underside of the dibbler frame 28 is provided with a plurality of depending dibbler fingers 34 arranged in an array and at a spacing from one another corresponding to the rows of the receptacles 24' in the plant maturation tray 24. Thus, with a plant maturation tray 24 positioned by the conveyor 14 directly beneath the dibbler mechanism 26, downward reciprocation of the dibbler frame 28 causes the fingers 34 to penetrate and form planting depressions 36 in potting soil 60 which has been preloaded into each tray receptacle 24', in order to prepare the tray 24 for delivery to the transplant depositing station 22.

At the transplant depositing station 22, the present apparatus is provided with a transplanting mechanism, broadly indicated at 38, which basically comprises a frame 40 supported on a movable carriage structure, indicated only representatively at 42, for horizontal reciprocatory movements laterally between the transplant pick-up station 17 along the first tray support conveyor 10 and the transplant depositing station 22 along the second tray support conveyor 14, as well as vertical reciprocatory movements at each such station toward and away from the respective conveyors 10,14. All such reciprocatory movements of the carriage structure 42 are controlled by the microprocessor 15.

Mounted in depending fashion from the underside of the frame 40 are a plurality of spirally coiled transplanting shafts 44 arranged in a corresponding array and a corresponding number to the receptacles 24' of the plant maturation tray 24. Each coiled transplanting shaft 44 is rotatably supported by the frame 40 and the shafts 44 are collectively driven in common by a drive motor 46 through an intervening drive chain 48. The drive motor 46 is reversibly operable to enable selective driving of the shafts 44 in opposite rotational directions, actuation and deactuation of the drive motor 46 as well as switching of the rotational direction thereof being controlled by the microprocessor 15.

A plurality of holding implements 50 also depend from the underside of the frame 40, each holding implement 50 being located immediately adjacent and in association with a respective one of the coiled shafts 44. The holding implements 50 are mounted to be selectively extendable and retractable vertically downwardly from the frame 40 with each holding implement 50 having a needle element 52 which projects angularly from its downward end into close adjacency alongside its associated coiled shaft 44 when the holding implement 50 is extended downwardly. Such reciprocatory movements of the holding implements 50 occur simultaneously by a common actuating mechanism, shown only representatively at 54, which in turn is controlled by the central microprocessor 15.

Operation of the present apparatus to perform the method of the present invention may thus be understood. Initially, a seedling germination tray 12, in each receptacle 12' of which a seedling plant 56 is rooted in a soil plug 58, is positioned at the transplant pick-up station 17 on the first tray support conveyor 10 while a plant maturation tray 24, each receptacle 24' of which has been filled with a suitable quantity of soil 60, is placed on the other tray support conveyor 14 and advanced by driving thereof to a position directly beneath the dibbler mechanism 26. The dibbler mechanism 26 is operated by its drive mechanism 30 to reciprocate downwardly to a sufficient extent to insert the dibbler fingers 34 respectively into the receptacles 24' of the tray 24 to produce a soil depression 36 centrally in each thereof.

Figure 2A:
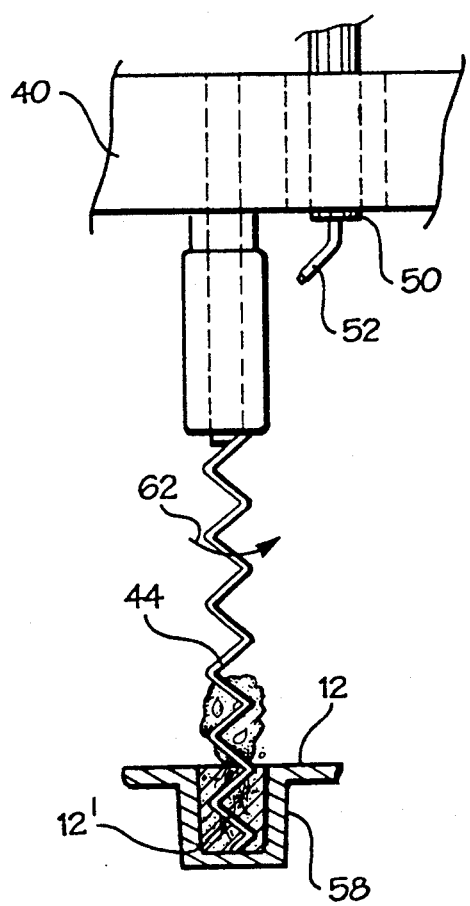
FIGS. 2A and 2B are schematic side elevational views of one coiled shaft and its associated holding implement at differing stages of operation.

The conveyor 14 is then re-actuated to advance the thusly-prepared tray 24 to the transplant depositing station 22. The frame 40 of the transplanting mechanism 38 is positioned by the supporting carriage structure 42 directly above the transplant pick-up station 17 of the conveyor 10 and the carriage 42 is operated to reciprocate the frame 40 downwardly while, at the same time, the drive motor 46 is operated in a first "forward" rotational direction, represented by the arrow 62 in FIG. 2A, to cause each coiled shaft 44 to penetrate a respective soil plug 58 of the tray 12. The movement of the carriage structure 42 as well as the driven positioning of the conveyor 10 are closely controlled and coordinated by the microprocessor 15, e.g., by limit switches or other suitable means, to ensure precise relative positioning of the coiled shafts 44 relative to the seedling tray 12 so that each shaft 44 penetrates its respective plug substantially coaxially about the plug axis, i.e., the lengthwise extent of the seedling and its roots system, thereby to prevent undesired damage thereto.

Figure 2B:
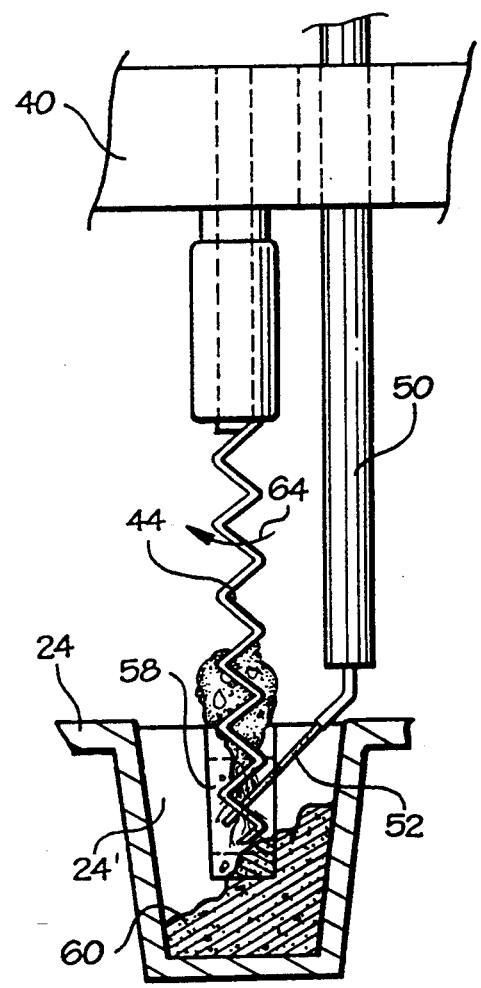

Next, the carriage structure 42 is operated in reverse to raise the transplanting mechanism frame 40 and to traverse it horizontally to a position directly above the tray 24 at the transplant depositing station 22. Thereupon, the frame 40 is again lowered to insert each coiled shaft 44 and the seedling 56 and soil plug 58 carried thereby as a unit into a respective one of the soil depressions 36 formed in the receptacles 24' of the tray 24. Upon such lowering of the frame 40, the holding implements 50 are operated by the actuating mechanism 54 to extend downwardly and to project their respective needles 52 to angularly penetrate each soil plug 58, whereupon the coiled shafts 44 are rotated by the drive motor in a "reverse" withdrawal direction, represented by the arrow 64 in FIG. 2B, which is opposite to the "forward" direction 62, to cause the shafts 44 to withdraw from the respective soil plugs 58 while they are held by the needles 52. Thereupon, the holding implements 50 are withdrawn, thereby to deposit the soil plugs 58 in the respective soil depressions 36 in the plant tray 24.

The thusly transplanted tray 24 is removed from the conveyor 10 as a new soil-filled tray 24 is advanced by the conveyor 10 to the preparation station 20. At the same time, the carriage structure 42 transports the transplanting frame 40 back to the transplant pick-up station 17 to retrieve another plurality of seedling and plug units 56,58 from the tray 12. The microprocessor 15 again controls the positioning of the carriage structure 42 to ensure that the coiled shafts 44 are positioned over a different sub-plurality of the receptacles 12' of the tray 12 which still contain seedlings. As operation of the apparatus continues in the foregoing manner, the microprocessor 15 also actuates incremental advancing movements of the conveyor 10 periodically to ensure that the seedling and soil plug units 56,58 in every receptacle 12' of the seedling tray 12 are transplanted to a maturation tray 24.

It is also contemplated that the holding implements 50, in addition to their function for securing the soil plugs 58 during withdrawal rotation of the coiled shafts 44, may be equipped to inject a supply of water into each plug 58, e.g., by formation of the respective needles 52 to be hollow tubes which communicate with a suitable water metering source.

As those persons of skill in the art will readily recognize, the transplanting method and apparatus of the present invention substantially reduces the labor expense typically involved in transplanting seedlings from a germination tray to a larger tray in which the seedlings are more sparsely arranged for further maturation. For example, it is contemplated that the operation of the method and apparatus of the present invention may be performed by only one person. At the same time, the present method and apparatus is expected to be capable of achieving a substantially increased rate of productivity in transplanting seedlings in comparison to that currently accomplished manually. Further, it is expected that the rotary spiraling penetration of soil plugs by the shafts 44 will pose a reduced risk of shock, damage and potential death to seedlings in comparison to manual transplantation thereof. As a net result, the present method and apparatus should substantially reduce the costs associated with the commercial cultivation of plants and thereby enable enhanced profits to be achieved.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim

1. A method of transplanting a plant from a first growing container, wherein the plant is rooted in a soil plug along a plug axis, to a second growing container, comprising the steps of:
   (a) penetrating the soil plug in the first container with a spirally coiled shaft coaxially about the plug axis while rotating the shaft in a first rotational direction,
   (b) withdrawing the plant and soil plug with the shaft as a unit from the first container by moving the shaft away from the first container in a direction along the plug axis,
   (c) inserting the withdrawn plant and soil plug with the shaft as a unit into the second container,
   (d) penetrating the soil plug with a holding implement while rotating the shaft in a second rotational direction opposite the first rotational direction to withdraw the shaft from the soil plug and to deposit the soil plug and the plant root therein within the second growing container, and
   (e) supplying water to the plant through the holding implement.

2. The transplanting method of claim 1, wherein a plurality of the plants are rooted in a corresponding plurality of the soil plugs at substantially uniform spacings in the first growing container and the second growing container has a plurality of plug depositing receptacles, the transplanting method further comprising simultaneously penetrating at least a sub-plurality of the soil plugs by a corresponding number of the coiled shafts, simultaneously withdrawing the penetrated soil plugs with the shafts from the first container, simultaneously inserting the withdrawn soil plugs and plants into a corresponding number of the receptacles of the second growing container, and simultaneously penetrating the soil plugs with a corresponding number of the holding implements while simultaneously rotating the shafts.

3. The transplanting method of claim 1, wherein the step of penetrating the soil plug with the holding implement comprises orienting the holding implement at an angle relative to the plug axis to avoid interference with rotation of the shaft.

4. The transplanting method of claim 1 and further comprising the step of providing a quantity of soil in the second growing container and forming a depression in the soil to receive the plant and soil plug.

5. Apparatus for transplanting a plant from a first growing container, wherein the plant is rooted in a soil plug along a plug axis, to a second growing container, comprising:
   (a) a spirally coiled shaft,
   (b) means for selectively moving the shaft toward and away from the soil plug generally coaxially about the plug axis respectively for penetrating the soil plug and for removing the soil plug and the plant as a unit with the shaft from the first container,
   (c) means for rotating the shaft in a first rotational direction to facilitate penetrating of the soil plug and in a second opposite rotational direction for withdrawal of the shaft from the soil plug,
   (d) a movable holding implement associated with the shaft for selectively penetrating the soil plug during rotation in the second rotational direction to facilitate withdrawal of the shaft from the soil plug, and
   (e) means for supplying water to the plant through the holding implement.

6. The transplanting apparatus of claim 5, wherein a plurality of the plants are rooted in a corresponding plurality of the soil plugs at substantially uniform spacings in the first growing container and the second growing container has a plurality of plug depositing receptacles, the transplanting apparatus further comprising a plurality of the spirally coiled shafts and a corresponding plurality of the holding implements mounted to a common support frame, the shaft moving means being operatively connected to the common support frame for simultaneous movement of the shafts toward and away from the soil plugs, the shaft rotating means comprising a common drive means connected to each of the shafts for simultaneous rotation thereof, and actuator means connected in common to each of the holding implements for simultaneous actuation thereof.

7. The transplanting apparatus of claim 5, wherein the holding implement is oriented at an angle relative to the plug axis to avoid interference with rotation of the shaft.

8. The transplanting apparatus of claim 5 and further comprising means for forming a depression in a soil supply in the second growing container to receive the plant and soil plugs.

* * * * *